423-111 SR
1/6/87 03 H 000•189

United States Statutory Invention Registration [19]

[11] Reg. Number: H189

Bauer [43] Published: Jan. 6, 1987

[54] PROCESS FOR PRODUCTION OF ALPHA ALUMINA BODIES BY SINTERING SEEDED BOEHMITE MADE FROM ALUMINA HYDRATES

[75] Inventor: Ralph Bauer, Niagara Falls, Canada

[73] Assignee: Norton Company, Worcester, Mass.

[21] Appl. No.: 755,510

[22] Filed: Jul. 16, 1985

[51] Int. Cl.[4] ..... C01F 1/00; C01F 7/24

[52] U.S. Cl. ..... 423/111; 423/626

[58] Field of Search ..... 423/111, 626

[56] References Cited

U.S. PATENT DOCUMENTS

| | | | |
|---|---|---|---|
| 1,132,737 | 3/1915 | Schwahn | 423/626 |
| 1,354,824 | 10/1920 | Goldschmidt | 423/626 |
| 1,570,353 | 1/1926 | Jacobsson | 423/626 |
| 2,006,851 | 7/1935 | Wied brauck et al. | 423/626 |
| 2,249,761 | 7/1941 | Hixson et al. | 423/626 |
| 2,595,416 | 5/1952 | Schmerling | 423/626 |
| 2,973,245 | 2/1961 | Teter et al. | 423/626 |
| 3,480,389 | 11/1969 | Graulier | 423/626 |
| 3,954,957 | 5/1976 | Koenig | 423/626 |
| 4,032,472 | 6/1977 | McCallister | 423/626 |

*Primary Examiner*—John F. Terapane
*Assistant Examiner*—Eric Jorgensen
*Attorney, Agent, or Firm*—Rufus M. Franklin; Frank S. Chow

[57] ABSTRACT

Inexpensive hydrates of alumina are used for the production of dense, submicron alumina bodies by conversion of the alumina hydrates to a soluble form which is then used to produce a boehmite gel. The boehmite gel, with very small particles of alpha alumina intimately dispersed therein is dried and fired to 1300° C. to 1450° C.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PRODUCTION OF ALPHA ALUMINA BODIES BY SINTERING SEEDED BOEHMITE MADE FROM ALUMINA HYDRATES

BACKGROUND OF THE INVENTION

Recently it has been discovered that colloidal boehmite (alpha alumina monohydrate) when formed into a gel or gel-like paste, and seeded with ultrafine (less than 0.1 micron) alpha alumina particles, can be converted, by relatively low temperature firing into alpha alumina bodies of extremely fine crystal size (0.5 microns and finer) and substantially full density. The final density can be less, if desired, when shorter firing time or lower temperature or both are employed.

The final product alumina may be in the form of shaped bodies, such as tubes for filtration and the like, high desnity substrates for electronic purposes, wear resistant or refractory parts, and abrasive grits. The alumina may also form a matrix for bonding other refractory abrasives, or wear resistant materials.

One problem with the commercial development and use of such products is the relatively high cost of the suitable colloidal boehmites now available.

Current production of colloidal boehmite in industry stems from two main routes:

1. Aluminum alkoxide (or other Al-organic) hydrolysis
2. Neutralization of sodium aluminate liquors The first method relies on aluminum powder (of high purity). In the past the boehmite generated was actually a by-product of the Ziegler process for production of linear alcohols and hence production was limited by the alcohol market. However, it is possible to form the alkoxide and then recycle the alcohol to eliminate this dependence on the alcohol market. Clearly, the economics of this process depend largely on the price of aluminum powder, a relatively expensive commodity.

The second technique requires precipitating the boehmite (or precursor) from a solution of sodium aluminate. This results in some loss of reagents and requires that extensive washing of the precipitate be done to eliminate sodium salts which are generally deleterious to the end product application. While precipitation from sodium aluminate itself is not a costly procedure, the loss of reagents and extensive washing (filtering) makes this process relatively expensive as well.

DETAILED DESCRIPTION OF THE INVENTION

The preferred method of preparation of colloidal boehmite for use in this invention involves digestion of hydrated alumina such as boehmite, gibbsite, or hydrargillite with a volatile acid such as nitric. The alumina hydrate may be in the form of commercial prepared product such as Alcoa hydral 710, or if certain impurities can be tolerated may be in the form of raw bauxite or other mineral source of acid soluble alumina. Caution must be exercised in using commercial alumina hydrates to minimize their sodium oxide contents; for production of hard (dense) alpha alumina, the soda content should be less than about 0.2 w/o, preferably less than 0.1. The soda content of most bauxites is negligible but many other impurities are present, however in some applications these can be tolerated.

The digestion of alumina hydrate which acid is a well known chemical reaction. The product aluminum nitrate may be used in solution form, or dried (crystallized) as the hydrate $Al(NO_3)_3 \cdot 9H_2O$. It will be realized, of course, that any sodium present in commercial hydrate will dissolve as well. Similarly oxides of iron will dissolve along with the alumina if bauxite is employed.

Also small amounts of other impurities will dissolve analgously (SiO2, TiO2).

The dissolution is best done in stirred vessels at elevated temperatures (near the boiling point). Acids other than nitric may be used: sulfuric is particularly effective in the dissolution step but later processing makes nitric the preferred acid.

Once the solution (or solid product) of aluminum nitrate is obtained, colloidal boehmite may be formed by two different routes:

(i) Neutralization with base ($NH_4OH$ or $NH_3$).

(ii) Denitration at elevated temperature followed by autoclaving on aqueous slurry in the boehmite phase field of temperature and pressure.

In method (1) it has been found that solutions of about 2 m are effective to producing boehmite with aqueous ammonia added in excess as a 28 weight percent solution. Gaseous ammonia may also be bubbled through to obtain similar results. The reaction is $Al(NO_3)_3 + 3NH_4OH \rightarrow ALOOH + 3NH_4NO_3$. The aqueous ammonia is preferably added as rapidly as possible to a warm solution of the nitrate. There is no need to warm the ammonia solution as the enthalpy of neutralization serves to heat it as it is added. It is preferred that the resultant gelatinous mass be continuously and rapidly stirred as neutralization proceeds and, that once additions are complete, to let the mass age and dehydrate for several hours (e.g. overnight) at $\geqq 80°$ C. The addition of alpha alumina seeds may take place either before, during, or after hydrolysis without any appreciable differences to the fired product.

After dehydration the gelatinous mass contains large amounts of ammonium nitrate by-product. This may be eliminated by filtering, but the preferred method is to volatilize the bulk of it by a roasting step as follows:

$$NH_4NO_3 + 3/2O_2 \rightarrow heat \rightarrow 2NO_2 + 2H_2O.$$

The reaction is, in fact, much more complex than depicted above but is illustrated for simplicity.

It is desirable to capture the evolved $NO_2$ (actually $NO_X$) and convert it to nitric acid which may be recycled into the dissolution phase of the system. This conversion is possible and, in fact, is the basis for commercial production of nitric acid as for example by American Cyanamid. In that process 3 moles of $NO_2$ react with one mole of water to produce 2 moles of nitric acid and one mole of NO. Oxygen is introduced to oxidize the NO to $NO_2$ which is recycled in the system.

In the alternative process (ii) the solid aluminum nitrate is recovered by evaporization and crystallization from the aluminous nitrate solution. The hydrated crystals are dried and roasted to drive off at least enough oxides of nitrogen to bring the $Al_2O_3$ to nitrate mole ratio to greater than 2.5/1. The nitrate depleted material is then autoclaved under autogenous pressure at 150° C. to 300° C. to convert the material to micro-crystalline boehmite. While it is more difficult to achieve a crystal size below 150 Angstroms in this autoclaving process, the process has the advantage of not requiring the use of ammonia. For best results the boehmite crystal size should be less than 150 Angstroms no matter which process (i) or (ii) is used. Most preferable is a size of 100 Angstroms or less.

In the following examples the term "milled water" refers to a water suspension of submicron alpha alumina particles produced by "milling" water with alumina grinding media in a vibratory mill. A suitable mill is such as that shown in U.S. Pat. No. 3,100,088. Typically the media may be sintered alumina cylinders ½" in diameter by ½ to ¾" long. The interior surface of the mill is preferably lined as with rubber or plastic to avoid contamination by metal walls. Milling for 10 to 12 hours is sufficient to produce a water suspension of suitable seed material. The debris (alumina) in the milled water has a typical surface area (measured by the B.E.T. nitrogen absorption method) of 40 square meters per gram. This corresponds to a theoretical particle size of the order of 0.04 microns. An alternative to the use of such milled water is the use of the supernatant liquid when a very fine commercial alumina is allowed to settle for several days in a water suspension.

Seed material of the proper size is effective in amounts as small as 0.1% by weight of alumina solids. No advantage is achieved in addition of over 5% by weight, based on the weight of the fired alumina solids. Although the optimum sizing for the seed material is not known, clearly it must be below 0.1 microns, and probably much finer. As used in this invention "effective amount" of seed means that amount of seed which results in a density of 3.9 grams/cc or higher and a crystal size in the fired alpha alumina of less than one micron when fired at 1350° C. for five minutes. When using "milled water" as a source of seed, the optimum amount of seed is 1% by weight of the alumina solids.

Again during the roasting operation, the oxides of nitrogen are captured and recycled as nitric acid; alpha alumina seeds are added and the sol-gel dried and fired as in process 1. This procedure has the advantage of not requring ammonia but has the disadvantage of requiring an autoclaving step.

Example 1. Illustrates Utility of Method (i).

75 g of reagent grade $Al(No_3)_3$, $9H_2O$ was dissolved in 100 ml tap water and heated to 90° C. Rapidly and with vigrous stirring 80 ml of 28 w/o $NH_4OH$ solution (at room temperature) was added. The temperature of the reaction mixture was about 85° C. after the $NH_4OH$ addition owing to the enthalpy of reactions. To this gelatinous slurry was added 3 grams of "milled water" containing 6% of alpha alumina seeds. The whole was left at 85° C. on a hot plate overnight to give a moist gel. This was placed under heat lamps to vaporize the bulk of $NH_4NO_3$ to obtain hard dry lumps of white gel. These lumps were crused to abrasive grits through a 28 mesh screen and on a 44 mesh screen. The X-ray diffraction pattern of these glassy grains revealed boehmite of extremely fine crystalline size (35–50 A).

The grains were plunged into a tube furnace at 1390° C. for four minutes, cooled and examined. They were translucent-white granules with a hardness of 20 GPa. Empirically these grains looked equivalent to or better than any produced from commercial boehmite gels.

Example 2. Illustrates Utility of Method (ii).

A beaker containing about 300 g of $Al(NO_3)_3.9H_2O$ was heated in a muffle furnace at 270° C. for 16 hours. The resulting fluffy-caked mass had a loss on ignition of 18% calculating to an Al2O3/NO3 ratio of about 2.8 to 1 (assuming nitrate as the only volatile). The X-ray diffraction of this material showed it to be completely amorphous.

25 Grams of this was pulverized to −80 mesh and placed in a stainless steel 1 liter autoclave with 250 ml of tap water. The autoclave was heated to 160° C. in ½ hour, held at 160° C. for 2½ hours and cooled in about 15 minutes. This yielded a translucent sol of low viscosity which was evaporated at 90° C. to a dried translucent cake which X-ray diffraction revealed to be boehmite with ultimate crystallite diameter 60–110 A, FIG. 5. This material was crushed as in example 1 and fired at 1370° C. for 4 minutes to give an opaque-translucent body which had a hardness of 18 GPa. Such grains would have excellent utility as abrasive materials.

When the roasting of the $Al(NO_3)_3.9H_2O$ was carried out for only 8 hours a cake which analysed as $Al_2O_3H$-$NO_3$ was obtained which yielded a white gel on autoclaving but did not sinter well tending to crumble and become chalky.

Example 3. Illustrates method 1 with Bauxite starting material.

80 Grams of abrasive grade bauxite which had been Sweco milled for 22 hours was mixed with 200 ml tap water and 160 ml 70% nitric acid, heated to 110° C. and left to digest for 2 hours at this temperature. The hot slurry was then filtered with a Bucher funnel using glass fibre filter paper and the residue washed with 3×50 aliquats of tap water. The residue was dried and weighed 12.4 g indicating that about 85% of the bauxite dissolved.

200 ml of the solution after filtering was heated to 90° C. and 160 ml of 28% $NH_4OH$ added rapidly. This gelatinous slurry was vigourously stirred and 4 ml of 6.25% "milled" water also stirred in with an additional 50 ml water. This was dried at 90° C. over 24 hours and further dehydrated/denitrated at 200° C. under hot lights for 40 hours. This material X-rayed as boehmite of 100 Angstroms crystallite size. The gel was crushed to grains −28 +44 mesh and fired at 1380° C. for 4 minutes to give a light brown glassy grit which had average hardness of 16.5 GPa; also some grits were observed as high as 18.5 GPa.

The processes described herein permit production of alpha alumina at a lower cost and smaller ultimate crystalline sizes than commercially available at present. The process also enables control at each step to be exercised thereby avoiding present commercial product variability.

What is claimed is:

1. A method of making articles containing submicron alpha alumina in at least one phase, comprising (1) dissolving alumina hydrate in nitric acid, (2) converting the thus formed aluminum salt to boehmite having a crystal size below $100\times10^{-10}$ meters by nuetralization with ammonia, converting said boehmite to a gel by acidification, and firing said gel in the presence of at least 0.5% by weight of alpha alumina submicron seed particles to a temperature less than 1450° C. for a time such that the thus formed alpha alumina phase has an average crystal size of less than $0.5\times10^{-6}$ meters.

2. A method as in claim 1 in which the aqueous aluminous salt solution formed in step (1) is neutralized with ammonium hydroxide to form boehmite having a crystal size below $100\times10^{-10}$ meters.

3. A method as in claim 1 in which the aluminum salt is a nitrate salt and is dried and fired to increase the $Al_2O_3$l$NO_3$ ratio to at least 2.5 to 1 and then autoclaved at 150° to 300° C. to produce boehmite having a crystal size of less than $150\times10^{-10}$ meters.

4. A method as in claim 1 in which the alumina hydrate is in the form of naturally occuring ore.

5. A method as in claim 4 in which the ore is bauxite.

* * * * *